United States Patent [19]

Couture

[11] Patent Number: 4,649,017

[45] Date of Patent: Mar. 10, 1987

[54] NUCLEAR FUEL ROD TRANSFER CANISTER HAVING CORRUGATED FUNNEL

[75] Inventor: Michael V. Couture, Holyoke, Mass.

[73] Assignee: Combustion Engineering, Inc., Windsor, Conn.

[21] Appl. No.: 686,171

[22] Filed: Dec. 24, 1984

[51] Int. Cl.$^4$ ............................................. G21C 19/32
[52] U.S. Cl. .................................... 376/272; 376/261; 250/507.1
[58] Field of Search ............... 376/272, 462, 261, 438, 376/441, 442; 250/506.1, 507.1; 29/400 N, 723

[56] References Cited

U.S. PATENT DOCUMENTS

| 4,441,242 | 4/1984 | Hicken et al. | 29/419 R |
|---|---|---|---|
| 4,446,098 | 5/1984 | Pomaibo et al. | 376/261 |
| 4,474,727 | 10/1984 | Kmonk et al. | 376/272 |
| 4,488,048 | 12/1984 | Bienek et al. | 376/272 |
| 4,507,840 | 4/1985 | Steinert et al. | 376/272 |
| 4,619,808 | 10/1986 | Formanek | 376/272 |

OTHER PUBLICATIONS

"The Problem of Nuclear Waste-We've Got to Solve It Soon", Changing Times, Feb. 1979, pp. 31-33.
"NAC to Test DOE Calculation that Repacking Can Add Spent Fuel Storage at $10/KG", Nuclear Fuel, Jan. 19, 1981, p. 16.

Primary Examiner—Deborah L. Kyle
Assistant Examiner—Dan Wasil
Attorney, Agent, or Firm—John H. Mulholland

[57] ABSTRACT

A canister for the consolidation of nuclear fuel rods (22) comprises an elongated, tapered box (24) of generally rectangular cross-section having upper (42) and lower (44) internal sections, the upper section having rectangular grid structure (46) and the lower section having vertically extending plate members (48). The upper section receives individual fuel rods in a relatively loosely packed rectangular array of rows and columns and urges the rods closer together as they are lowered into the box, such that the rods emerge through the lower end of the grid section in a relatively tightly rectangular array. The number of plate members (48) in the lower section corresponds to the number of rows of fuel rods in the upper section. Each plate has tapered side edges (204) abutting the tapered box, and a plurality of integrally formed, corrugated channels (206) corresponding to the number of rows of fuel rods. These channels guide the fuel rods into a triangularly pitched array, and the decreasing space between adjacent plates causes the fuel rods to move closer together as they move through the box. At the lower edge (202) of each plate the corrugations form a periodic series of alternating convex (208) and concave (210) arches such that each concave arch on one plate faces a concave arch on the adjacent plate. At their closest spacing, the edges of adjacent arches are separated by a distance substantially equal to a fuel rod diameter.

6 Claims, 11 Drawing Figures

NUCLEAR FUEL ROD TRANSFER CANISTER HAVING CORRUGATED FUNNEL

BACKGROUND OF THE INVENTION

The present invention relates to the storage of spent nuclear fuel, and in particular to apparatus employed to consolidate fuel rods after removal from the fuel assembly frame structure.

For a variety of reasons, the disposal, reprocessing or storage of spent nuclear fuel assemblies has posed significant obstacles to many utilities operating nuclear power plants. As a consequence, efforts have recently been directed toward consolidated nuclear fuel storage, by which the individual fuel rods are removed from spent fuel assemblies and stored in a tightly packed array until ultimate disposal methods can be found.

In co-pending U.S. application Ser. No. 535,105, "System and Method for Consolidating Spent Nuclear Fuel", filed Sept. 23, 1983 and assigned to Combustion Engineering, Inc., apparatus is disclosed for removing fuel rods from two fuel assemblies and consolidating the rods into an area equivalent to one fuel assembly. The consolidation is implemented at three stations, one of which includes an interim fuel transfer canister where the fuel rods are rearranged from a relatively loosely packed rectangular array into a relatively tightly packed triangular array. This is accomplished by inserting the rods between long flat plates, portions of which are contained within a funneled canister having a tilted base. The canister walls, variation in plate lengths, and tilted base, tend to force the fuel rods into the desired final array.

It has been found that the transfer canister described in the foregoing application does not provide sufficient guidance to individual fuel rods to permit the degree of trouble-free canister loading that is desired. Accordingly, a need was recognized to improve upon this prior canister design.

SUMMARY OF THE INVENTION

According to the present invention, a canister for the consolidation of nuclear fuel rods comprises an elongated, tapered box of generally rectangular cross-section having upper and lower internal sections, the upper section having rectangular grid structure and the lower section having vertically extending plate members. The upper section receives individual fuel rods in a relatively loosely packed rectangular array of rows and columns and converges and urges the rods closer together as they are lowered into the box, such that the rods emerge through the lower end of the grid section in a relatively tightly rectangular array. The number of plate members in the lower section corresponds to the number of rows of fuel rods in the upper section. Each plate has tapered side edges abutting the tapered box, and a plurality of integrally formed, corrugated channels corresponding to the number of rows of fuel rods. These channels guide the fuel rods into a triangularly pitched array, and the decreasing space between adjacent plates causes the fuel rods to move closer together and converge as they move through the box. At the lower edge of each plate the corrugations form a periodic series of alternating convex and concave arches such that each concave arch on one plate faces a concave arch on the adjacent plate. At their closest spacing, the edges of adjacent arches are separated by a distance substantially equal to a fuel rod diameter.

With the present invention, the fuel rods are more tightly constrained during their movement within the canister, such that their inherent tendency to bend, or twist is overcome. The transition from a rectangular array to a triangular pitched array is more predictable and well defined, as compared with earlier designs.

BRIEF DESCRIPTION OF THE DRAWINGS

The preferred embodiment of the invention and the best mode for carrying out, will be described herein after with reference to the accompanying drawings, in which.

DESCRIPTION OF THE PREFERRED EMBODIMENT

Figure 1:
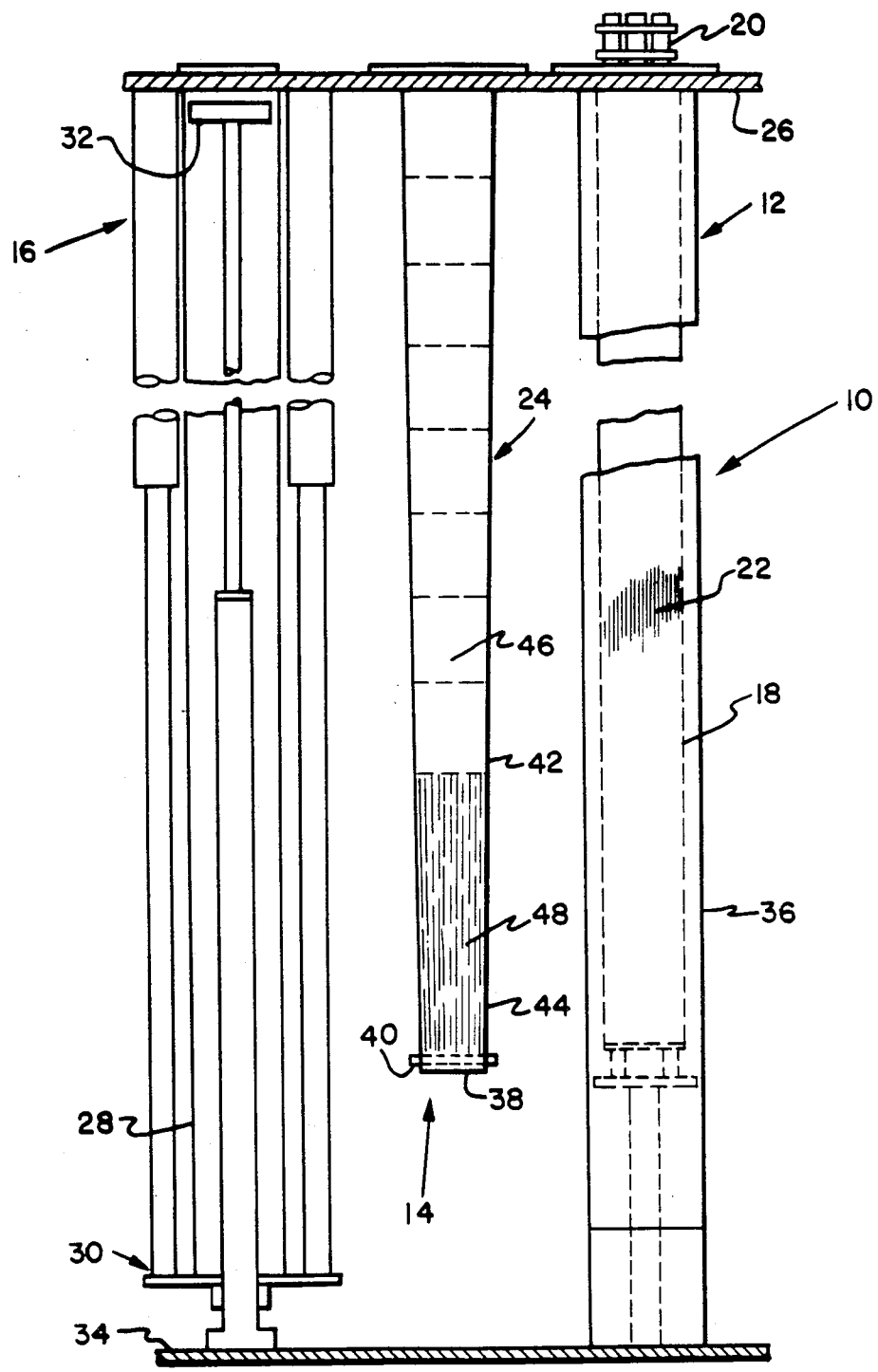
FIG. 1 is a schematic representation of a prior art fuel consolidation station, in which the preferred embodiment of the present invention is shown as the central station.

FIG. 1 shows a portion of a nuclear fuel rod consolidation system 10 of the type generally disclosed in U.S. Ser. No. 535,105 "System and Method for Consolidating Spent Nuclear Fuel", the disclosure of which is hereby incorporated by reference. The portion of the system in which the present invention can be best described, comprises a disassembly station 12, a fuel rod transfer station 14, and a fuel consolidation station 16. As more specifically described in the incorporated reference, a nuclear fuel assembly 18 is placed within the disassembly station 16 where the assembly structural members such as end fitting 20, are removed and the individual fuel rods 22 are lifted out of the assembly. The fuel rods will then be inserted into the transfer canister 24 where their spacing will be significantly reduced, and the transfer canister 24 will be lifted through the table 26, lowered onto the storage box 28, and the fuel rods lowered from the transfer canister 24 down into the storage box 28, by means of first and second elevators 30, 32 respectively. To improve understanding of the operation of the consolidation system 10, a container spanning the distance between the fuel pool cavity floor 34 and the table 26, of the type shown at 36 surrounding the fuel assembly 18, have been omitted with respect to the transfer station 14 and the consolidation station 16.

The present invention is directed to features associated with the transfer canister 24. The canister according to the present invention, provides functions similar to those described in the incorporated reference, but with significantly improved structure. In essence, the transfer canister 24 receives at its upper end, a relatively loosely packed, rectangular array of fuel rods which are funneled through the canister and rearranged into a close packed, triangular array resting on the canister base 38 (shown in phantom). After the canister 24 has been filled and relocated on the table 26 above the storage box 28, the locking means 40 are released so that the canister base 38 rests on the second elevator 32. By sequentially actuating the first elevator 30 and second elevator 32, the canister base 38, and the fuel rods supported thereon, are lowered into the storage box in unison. The transfer canister 24 may then be reused in the consolidation system 10, and the storage box 28 is removed from the consolidation system 10 and placed into a nuclear fuel storage area (not shown).

The transfer canister 24 is a generally elongated, tapered box of generally rectangular cross-sections having upper and lower internal sections 42 and 44, respectively. The upper section has grid means 46 for receiving individual fuel rods in a relatively loosely packed rectangular array of rows and columns, and for urging the rods closer together as they are lowered into the box, such that the rods emerge through the lower end of the upper section, in a relatively tightly packed rectangular array. The lower section 44 is adapted to receive the rods as they emerge from the upper section. The rods pass through a plurality of substantially vertical plate members 48 corresponding to the number of columns of fuel rods in the upper section. When the word "corresponding" is used in this sense it should be realized that "approximate corresponding" is meant since there is always one more open square in a column or row than there are intermediate plates between the open squares, as seen, for example, in FIG. 4. The upper and lower sections 42, 44 will now be described in greater detail.

Figure 2:
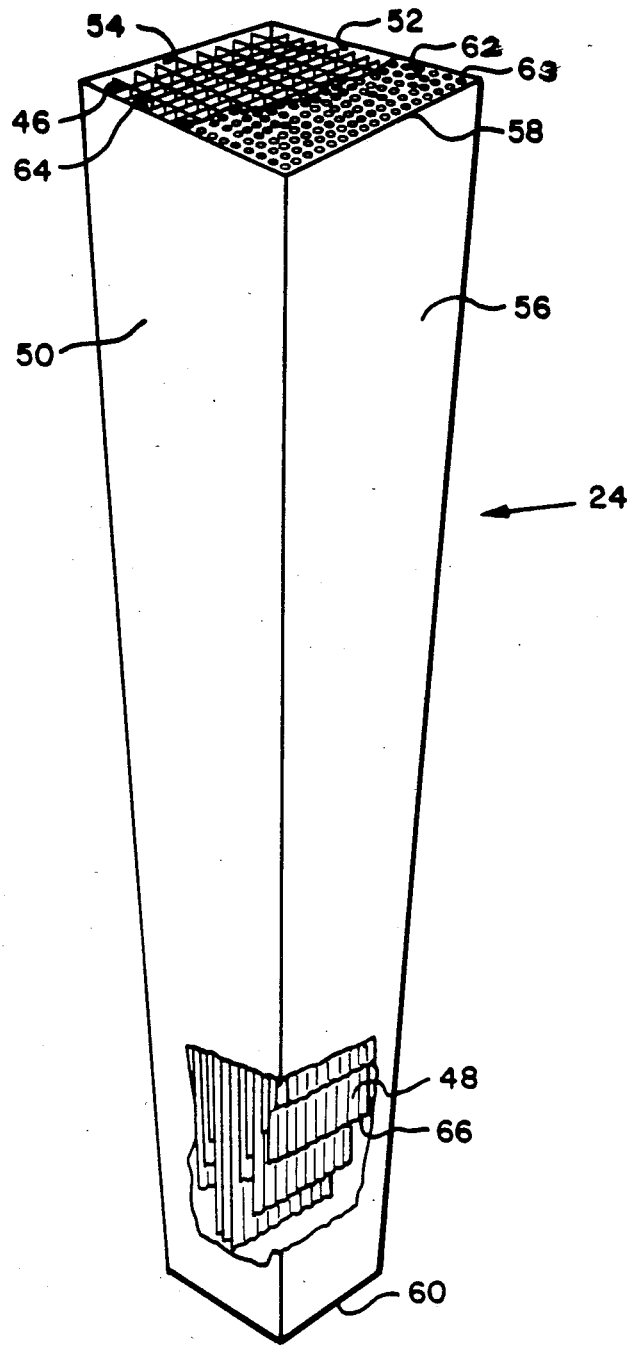
FIG. 2 is a perspective view the preferred embodiment of the invention, wherein the box portion of the fuel transfer canister have been partially cut away to show the grid structure at the top and the plate members at the bottom.

FIG. 2 is a perspective view of the preferred transfer canister 24, and the end in which the box outer structure has been arbitrarily identified as comprising front panel 50, back panel 52, left side panel 54, and right side panel 56. Preferably, each panel is downwardly tapered such that the rectangular cross-sectional area at the upper end 58 is approximately equal to the cross-sectional area of two nuclear fuel assemblies 18 (FIG. 1), and the rectangular, cross-sectional area of the lower end 60 is approximately equal to that of one fuel assembly.

At the open, upper end 58 of the canister 24 a top plate 62 provides guide means in the way of rows and columns of holes 63, through which the fuel rods are maintained in a predetermined, rectangular array as they enter the canister. The top plate 62 is partially cut away to show the uppermost extent of the grid means 46, which defines an individual cell 64 beneath each hole 63 in the top plate 62.

The lower portion of the canister 24 is cut away to show corrugated plate members 48, disposed side-by-side between front panel 50 and back panel 52. The lower edges 66 of the plates are corrugated and, in the preferred embodiment, terminate at different elevations within the canister 24.

Figure 3:
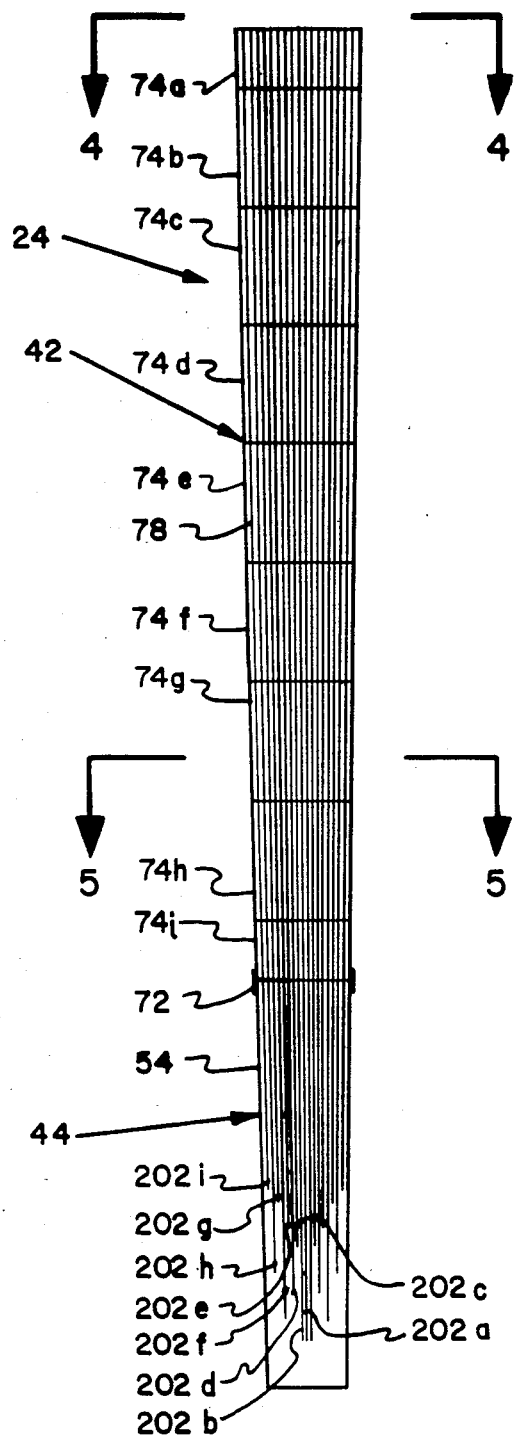
FIG. 3 is a elevation front view of the transfer canister shown in FIG. 2 with the front panel removed to show the upper, grid section and the lower, plate section.
Figure 4:
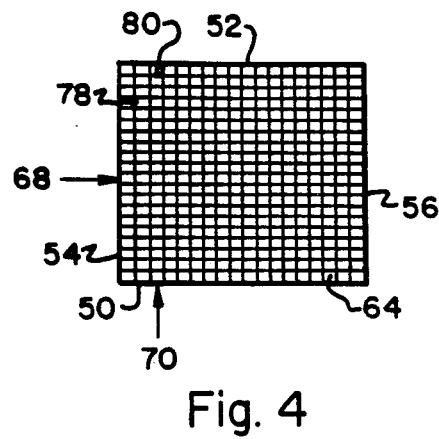
FIG. 4 is a plan view of the transfer canister shown in FIG. 3, taken from above with the top plate removed to show the rows and columns of cells formed by the grid structure.
Figure 5:
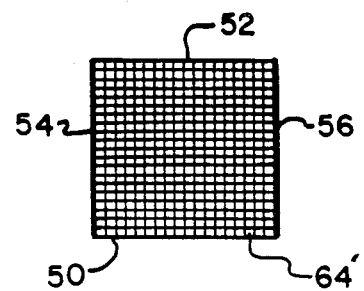
FIG. 5 is a section view taken along lines 55, of FIG. 3, showing the reduced dimensions of the box and cells part-way down the box taper.

FIGS. 3-6 illustrate in greater detail the relationship between the grids 46 and the plates 48 within the canister 24. FIG. 3 is an elevation view of the canister 24 viewed from the front, with the front panel 50 removed. FIG. 4 is a plan view of the canister 24 from above, with the top plate 62 (FIG. 2) removed. The upper section 42 when thus viewed from above, has a multiplicity of honey-comb, substantially continuous cells arranged in a rectangular array of, for example, twenty rows 68 extending from the left panel 54 to the right panel 56, and eighteen columns 70 extending from the front panel 50 to the back panel 52. As the box tapers downwardly to the interface 72 between the upper and lower sections 42, 44 respectively, the cross-sectional area of each cell varies with elevation in substantial proportion to the variation in the cross-sectional area of the canister or box 24. FIG. 5, a cross-section taken at line 5—5, illustrates the proportional decrease in the area of cell 64 as the dimensions of the panels 50, 52, 54 and 56 have decreased. In the preferred embodiment, wherein the upper section 42 is approximately 100 inches in length, the cross-sectional area at interface 72 is approximately 60% of the cross-sectional area at the top of the canister 24.

Fuel rods inserted through the upper section 42 emerge into the lower section 44 in a relatively tightly packed, rectangular array. The lower section 44 is adapted to receive the rods within a plurality of substantially vertical plate members 48, the number of which correspond to the number of columns 70 of fuel rods in the upper section 42. These plates 48 are shaped and aligned such that the rods passing between them are forced into a closely packed, triangular array at the lower end 60 of the canister 24. The following sections provide additional detail on the inventive features associated with the grid means 46 constituting the upper section 42, and the corrugated plate members 48 constituting the lower section 44.

GRID STRUCTURE

Figure 6:
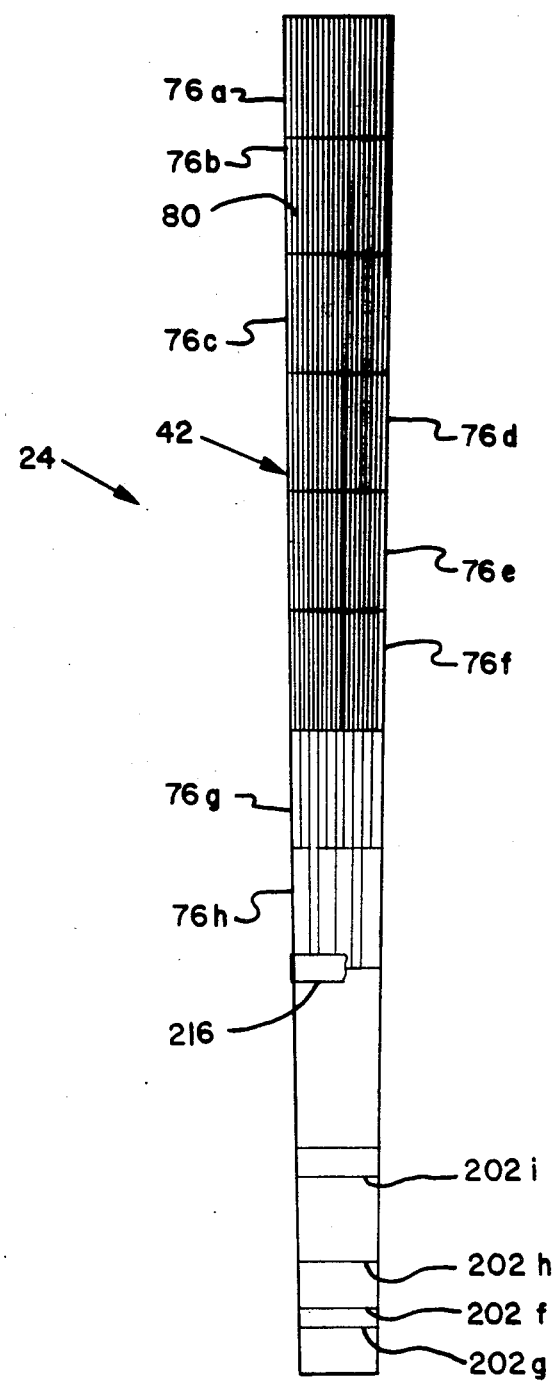
FIG. 6 is an elevation view of the canister of FIG. 3, taken from the left side with the left panel removed to show the grid structure and plate structure therein.

The description of the grid structure will proceed with reference to FIGS. 3 through FIG. 6. FIG. 6 is an elevation side view of the canister 24 shown in FIG. 3, wherein the side panel 54 has been removed. The upper section 42 comprises a plurality of vertically overlapping grid layers 74a–74i and 76a–74h. Each grid layer 74a–74i comprises a plurality of grid segments 78 which extend from the front panel 50 to the back panel 52 and will be conveniently referred to as column segments constituting column grid layers. A plurality of transversely oriented segments 80 likewise will be referred to as row segments, and constitute the row grids 76.

It may be seen that column grid layers 74e and 74f have interposed between them row grid layer 76e. The overlapping intersection of the column layers 74 and row layers 76 provide alternating row and column structure which forms a substantially continuous honeycomb of longitudinal cells 64. To accommodate the overlapping or stagering of the transverse layers, the uppermost and lowermost column grid layers 74a and 74i, are half the height of the other column and row grids 74, 76. Typically, the entire grid structure 42 effectively contains eight column grids 74 and eight row grids 76.

In FIG. 6, it may be seen that row layers 76g and 76h may have less than a full complement of row segments 80 as a way to minimize the space occupied by structural material between converging fuel rods.

Figure 7:
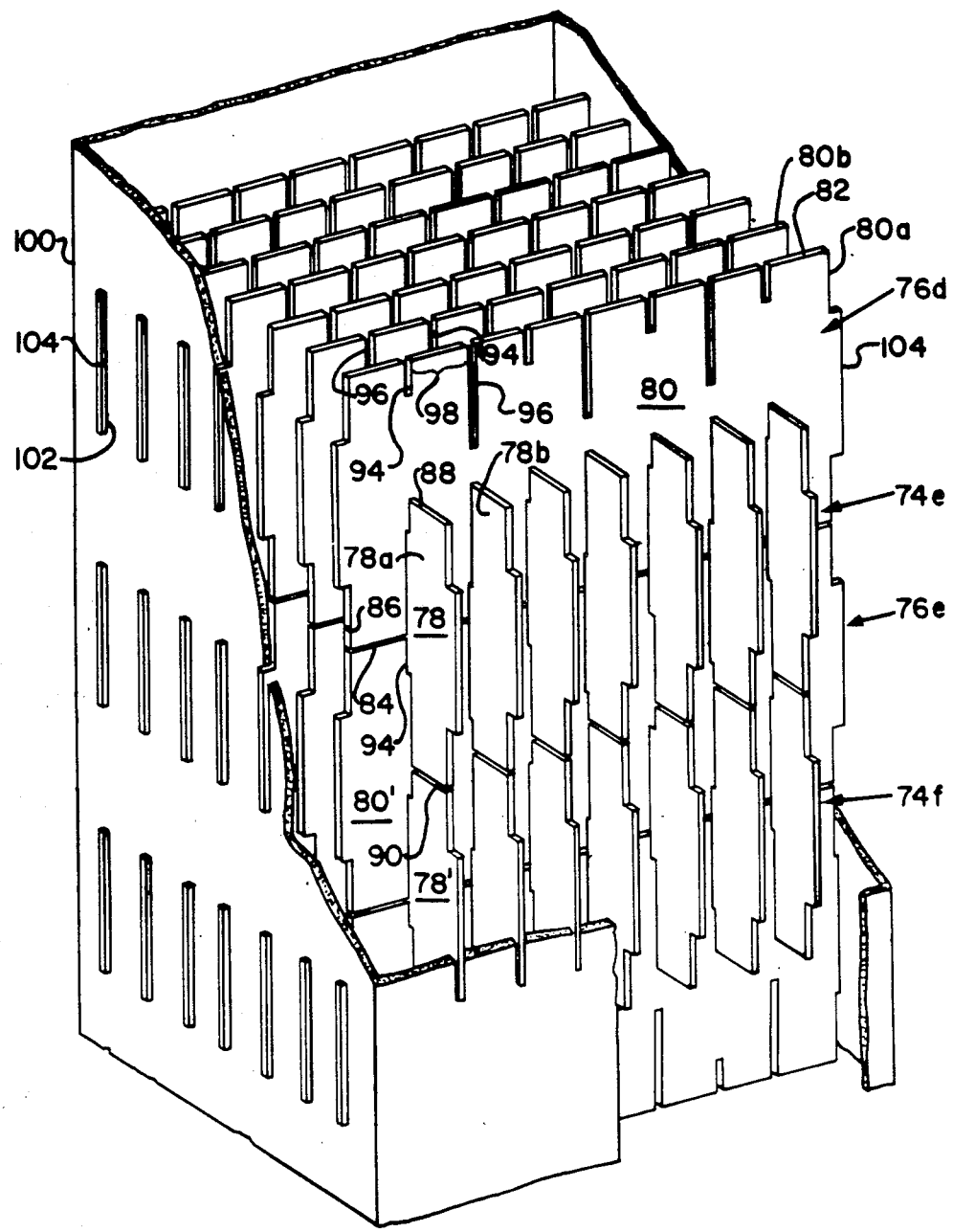
FIG. 7 is a perspective view of the intersection of row layers and column layers showing the short and long slits on individual grid segments, and a skin surrounding and joining the layer outer edges.

FIG. 7 illustrates in detail, the intersection of, for example, row grid 76d, column 74e and row grid 76e. FIG. 7 is a perspective view oriented similarly to FIG. 2. FIG. 8 is an elevation view facing the row grids 76d and 76e as shown in FIG. 7. In FIG. 7, the tapered sides of the segments and layers are not illustrated since the focus is on the intersection of the layers. In FIGS. 7 and 8, the layers and segments have been simplified with respect to the number of cells, relative to FIG. 3–6, for clarity of illustration.

Referring now to FIGS. 7 and 8, each layer 76d, 74e, and 76e, comprises a plurality of substantially parallel, segments 78, 78' and 80, 80'. Each segment has a top edge 82, a bottom edge 84 and side edges 86. The side edges 86 of each segment are tapered to conform to the tapered panels 54, 56 (or in the case of column segments 78, to front and back panels 50, 52), at the elevation within the canister 24 where the segments are to be located. The outer dimensions of row segments 80 in layer 76 preferably, the bottom edge 84 of segment 80 is longer than the bottom edge 84' on segment 80', but is substantially the same length as the top edge 82' of segment 80'. Although the top and bottom edges 82, 84 are not the same length, they are parallel and thus the segment is trapezoidal. Each edge 82, 84 has alternating short and long slits, 94, 96, respectively, by which the segments are interconnected.

When the entire grid structure is assemblied within the canister 24 the multiplicity of cells defined by the intersection of the segments 78, 80 each provides a funnel for the individual rod inserted therein. The funnel results from providing the slits along each edge, such that the distance between slits is proportional to the length of the edge. Thus, each succeeding vertical portion of a given cell, has a slightly different dimension due to the proportionate spacing of the slits.

In the preferred embodiment, the combined length of a short and long slit which are in substantial vertical alignment, is approximately equal to one half the distance between the top and bottom edges of the segment. This assures that each cell wall will be substantially continuous and thereby avoids the possibility that fuel rods may hangup between segments of adjacent layers. Thus, it is preferred that the upper edge of segment in a row layer is substantially in contact 90 with the lower edge of a segment in the next higher row layer, and likewise for the column layers.

The arrangement of long and short slits permits ready construction of the grid layers and interconnections by transversely securing the long slits of one segment with the short slits of another segment. The transversely adjacent segments in a given row or column layer, such as 78a, 78b, and 80a, 80b in FIG. 7, alternate between, for example, the "four short, three long" slotted upper edge 78a and 80a and the "four long, three short" upper edge of segments 80b and 78b. The lower edge slot pattern likewise alternates. The vertically adjacent segments of different row and layers, e.g., segments 80 and 80' in row layers 76d, 76e, respectively, have similar slit patterns. This arrangement of segments having long and short slits assures that any portion of a segment serving as a cell wall, has only one long slit boundary. Thus, the portion remains more rigid and flatter, than if bounded by two long slits.

Figures 8A, 8B:
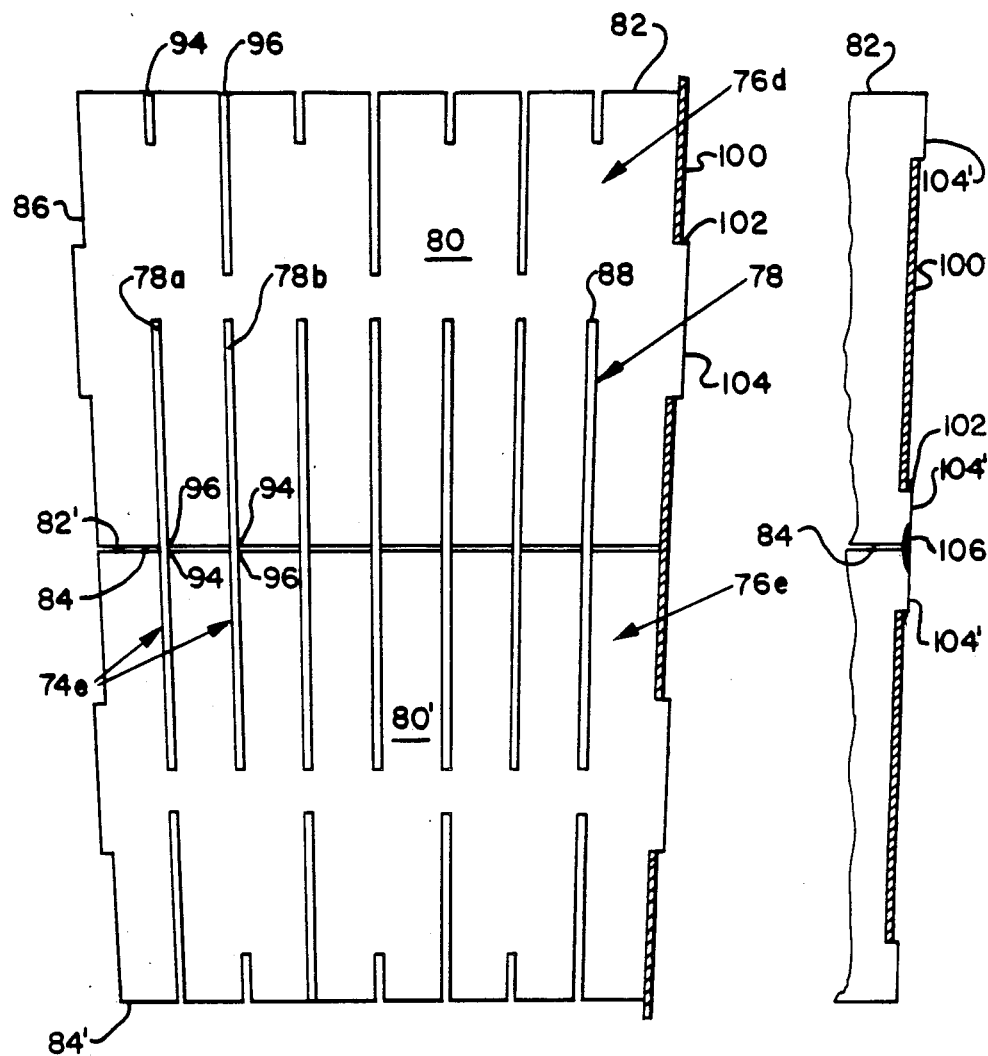
FIG. 8(a) is an elevation view of the grid row layers of FIG. 7, with the column layers oriented perpendicularly to the plane of the drawing.
FIG. 8(b) is an alternative embodiment with modified tabs on the outer edges.

It should be appreciated that the grid structure 46 is preferably assembled in its entirety, before insertion into the canister 24. The segments of each layer are interconnected starting with the lowermost 74i and 76h and the segments may be tack welded together to establish sufficient rigidity so that the structure may be handled for insertion into the canister. One such welding technique includes welding a ribbon or strip around the perimeter of the structure, at the interface between adjacent row layers, and likewise between adjacent column layers. One assembly technique is illustrated in FIG. 7 and 8(a), wherein a shroud or skin 100 with perforations 102, has slightly smaller dimensions than the tapered box 24 (FIG. 2), and is installed over tabs 104 on the perimeter or outer edges 86 of the layers. The tabs are spot welded and the entire shrouded grid section 42 is then lowered into the box. When the grid section is used in conjunction with the plate section 44 discussed below, the shroud or skin 100 spans the entire box and helps connect the grid section to the plate section.

FIG. 8(b) shows a preferred embodiment wherein the tabs 104' are extensions at the lower 84 and upper 82 edges of each segment so that the tabs from vertically adjacent segments penetrate the same shroud perforation 102 and can be joined with a single weld 106. The portions of segments near the box wall, that are otherwise unsupported due to a bordering long slit, can thus be strengthened. layers.

PLATE MEMBERS

The detailed description of the lower section 44 having the plate members 48, will proceed with reference to FIGS. 3, 6, 9 and 10, wherein specific structure will identified with numerals beginnning with 200.

Figure 9:
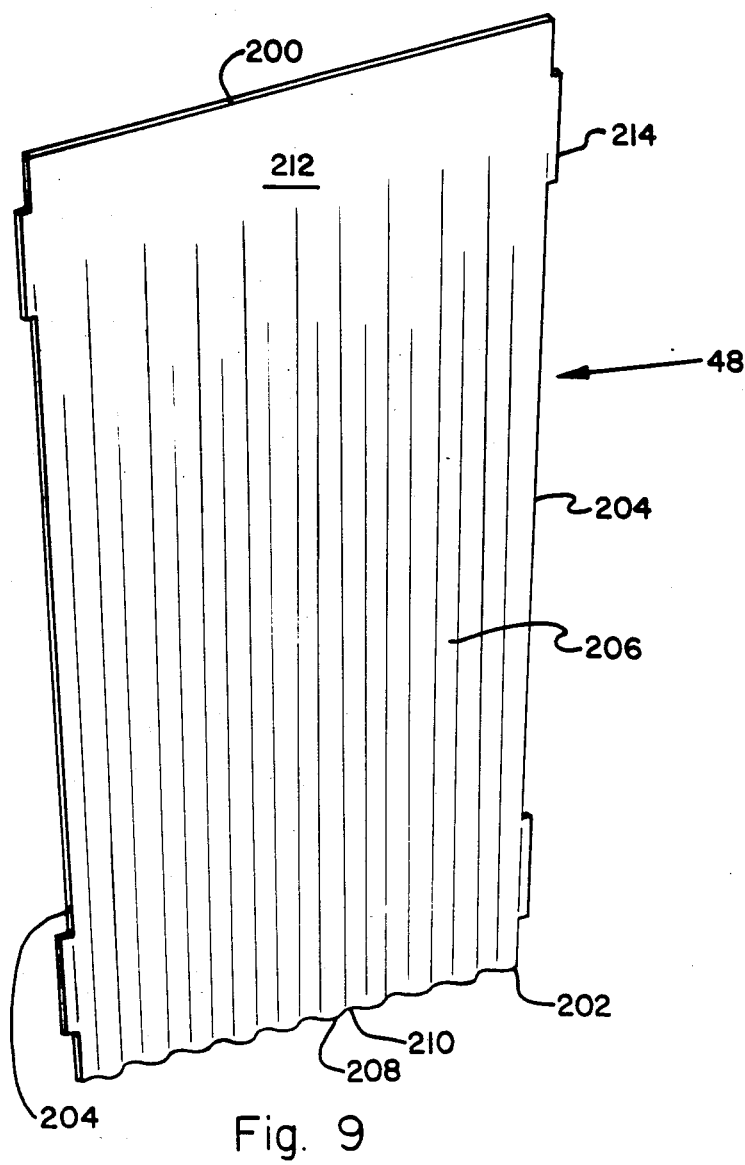
FIG. 9 is a perspective view of a corrugated plate member showing the integrally formed channels for guiding the fuel rods into a triangular pitch.

FIG. 9 shows a plate member 48 having substantially parallel upper and lower edges 200, 202 respectively, and tapered side edges 204. The side edges 204 are tapered to conform to the front and back panels 50, 52 of the lower portion of the canister 24. Each plate 48 has a plurality of corrugated channels 206 corresponding to the number of rows 68 of fuel rods (see FIG. 4). The corrugated channels 206 extend to the lower edge 202 and form a periodic series of alternating convex and concave arches 208, 210 respectively. Preferably, each plate 48 has a substantially flat area 212 beginning at the upper edge 200, with a gradual transition such that the amplitude of the convex and concave arches 208, 210, increase with distance from the upper edge 200.

The plate 48 is preferably formed in a die that has the required number of "dummy" rods welded to one die plate, each rod tapering slightly towards the center of the plate to converge the corrugations and in accordance with the overall designed taper of the side edges 204. Prior to pressing, however, the plate is rectangular and the side edges 204 will be finely dimensioned for mating with the canister panels, after pressing in the die. The integral formation of the corrugations having increasing amplitude as they approach the lower edge 202, tends to draw the side edges inward during pressing, but this is insufficient to produce the desired end taper on the side edges 204. The transition from flat to full amplitude on the corrugations is accomplished in the die by orienting the movable die member at a slight angle relative to the stationary die on which the dummy rods are secured, so that full deformation of the plate occurs only near the lower edge 202.

In the preferred embodiment, the upper end edge 200 of each plate is adapted to mate with and form a continuous guide path from, the grid means 406 of the upper section 42.

With reference to FIGS. 3 and 6, it may be seen that this transition occurs at the section interface 72. The simplest way to accomplish this interface is to provide an unslotted edge at the upper edge 200 of each plate 48 so that these engage long slits 96 provided on the lowermost segments 76h, of the grid means 46 (see also FIG. 8). At the interface 72, a band 216 or other member may be tack welded around the periphery of the interconnected structure, as was suggested with respect to the assembly of the layers 74, 76 of the grid structure 46, or in the preferred mode, the plates have tabs to mate with shroud perforations and for welding to tabs on the segments of grid layer 74i.

In the preferred embodiment, the plates are not all of the same length, so that the lower edges 202 are staggered. In FIG. 3, the lower edge 202a of the central plate and the plates between the center and the left panel 54, are labeled 202a-i respectively. When viewed from the side of canister 24 with left panel 54 removed, a different view of the staggered edges can be seen.

This staggering is necessary to maximize the consolidation within the canister since the plates have a significant thickness relative to a fuel rod diameter and the fuel rods should ideally have no separation when grouped in the triangular array at the lower end 60 of the canister 24.

Figure 10:
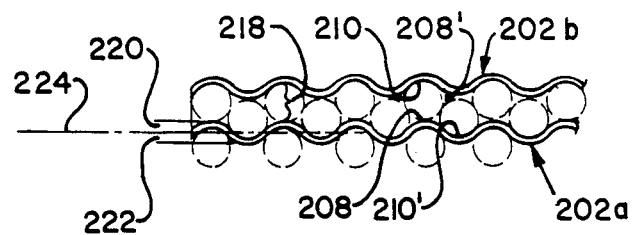
FIG. 10 is an end view of two adjacent corrugated edges of the plate members, showing how the arrangement and spacing of the convex and concave arches guides the fuel rods into a tightly packed triangular pitched array.

FIG. 10 shows the relationship of, for example, plate lower edge 202a and adjacent 202b. Each convex arch 208 on each plate 202a faces a concave arch 210 on plate 202b, and each concave arch 210' on plate 202a faces a convex arch 208, on 202b. The distance 218 between each convex and facing convex arch is substantially equal to a fuel rod diameter, as shown in FIG. 10, in phantom. This alignment and spacing of the plates causes the leading ends of the tightly packed rectangular array of fuel rods received by the lower section 44 to be consolidated between the plates and the box panels into a tightly packed triangular array at the lower edges of the plates. FIG. 10 also clarifies the meaning of arch amplitude, where the convex amplitude 220 and concave amplitude 222 are measured relative to a flat imaginary plane 224 an equal distance between them.

I claim:

1. A nuclear fuel rod consolidation canister for the consolidation of nuclear fuel rods, comprising:
    an elongated, tapered box of generally rectangular cross-section having upper and lower internal sections;
    the upper section having grid means for receiving individual fuel rods in a relatively loosely packed rectangular array of rows and columns, and for urging the rods closer together as they are lowered into the box, such that the rods emerge through the lower end of the upper section in a relatively tightly packed rectangular array;
    the lower section being adapted to receive the rods as they emerge from the upper section, and having a plurality of substantially vertical plate members corresponding to the number of columns of fuel rods in said upper section;
    each plate having substantially parallel upper and lower edges, inwardly tapered side edges abutting the box, and a plurality of integrally formed, corrugated channels corresponding to the number of rows of fuel rods, the corrugations extending to the lower edges of each plate and forming a periodic series of converging alternating convex and concave arches;
    wherein each plate is aligned with an adjacent plate such that each convex arch on one plate faces a concave arch on an adjacent plate, and each concave arch on said one plate faces a convex arch on said adjacent plate;
    whereby the leading ends of the tightly packed rectangular array of fuel rods received by the lower section are consolidated between the plates and box, into a tightly packed triangular array at the lower edges of the plates.

2. The canister of claim 1 wherein each corrugated plate is substantially flat at the edge located nearest said upper section, and wherein the amplitude of the concave and convex arches increases with the distance away from said upper edge.

3. The canister of claim 2 wherein the upper edge of the plate members is adapted to mate with and form a continuous guide path from, the grid means of the upper section.

4. The canister of claim 2 wherein the distance between the upper edges of adjacent plate members is substantially equal to the distance between fuel rod centers in the tightly packed rectangular array at the lower end of the upper section.

5. The canister of claim 1 wherein the lower edges of each plate is spaced from an adjacent plate such that the distance between each convex and facing concave arch is substantially equal to a fuel rod diameter.

6. The canister of claim 1 wherein the lower edge of at least some of the plates, are vertically staggered.

* * * * *